(12) United States Patent  (10) Patent No.:  US 9,120,246 B2
Oldroyd et al.  (45) Date of Patent:  Sep. 1, 2015

(54) PRESSURE TUNABLE EXPANDABLE MANDREL FOR MANUFACTURING A COMPOSITE STRUCTURE

(71) Applicant: Bell Helicopter Textron Inc., Fort Worth, TX (US)

(72) Inventors: Paul K. Oldroyd, Azle, TX (US); James D. Hethcock, Jr., Colleyville, TX (US); David B. McNeill, Wichita, KS (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 123 days.

(21) Appl. No.: 13/782,127

(22) Filed: Mar. 1, 2013

(65) Prior Publication Data

US 2014/0246141 A1   Sep. 4, 2014

(51) Int. Cl.
*B29C 33/04* (2006.01)
*B29C 43/02* (2006.01)
(Continued)

(52) U.S. Cl.
CPC ............ *B29C 33/02* (2013.01); *B29C 33/046* (2013.01); *B29C 33/485* (2013.01); *B29C 33/76* (2013.01); *B29C 53/821* (2013.01); *B29C 53/824* (2013.01); *B29C 66/8284* (2013.01); *B29C 70/347* (2013.01); *B29D 99/0089* (2013.01); *B31D 3/0223* (2013.01); *B32B 3/12* (2013.01); *B29C 35/045* (2013.01); *B29C 2035/046* (2013.01); *B29C 2043/3261* (2013.01); *B29L 2031/608* (2013.01); *B32B 2305/024* (2013.01)

(58) Field of Classification Search
CPC ........ B29C 33/00; B29C 33/02; B29C 33/04; B29C 33/046; B29C 33/76; B29C 43/02; B29C 2043/3261; B29C 53/821; B29C 66/8284; B29C 70/347; B32B 3/12; B32B 2305/024; B29L 2031/608; B29D 99/089
USPC ......................................... 156/189, 210, 292
See application file for complete search history.

(56) References Cited

U.S. PATENT DOCUMENTS 2,523,525 A * 9/1950 Sachs ............................ 156/210
3,795,559 A * 3/1974 Horn et al. ..................... 156/152
(Continued)

FOREIGN PATENT DOCUMENTS

DE  102006031335 A1  1/2008
FR      2322714 A1    4/1977
(Continued)

OTHER PUBLICATIONS

European Search Report in related European Application No. 13171127.7, dated Aug. 1, 2013, 5 pages.
(Continued)

*Primary Examiner* — Michael Tolin
(74) *Attorney, Agent, or Firm* — Noah A. Tevis (57) ABSTRACT

A method of making a composite core can include configuring a plurality of mandrels to have a desired thermal expansion characteristic, placing a composite material around each mandrel, placing the plurality of mandrels in a tool, the tool being configured to constrain the plurality of mandrels as the mandrels experience a thermal expansion, heating the mandrels so that the mandrels thermally expand, thereby applying a pressure to the composite material during a cure cycle, and then cooling and separating the mandrels from the composite core. The mandrel is configured as an internal form for making a tube member of a composite core.

7 Claims, 7 Drawing Sheets

(51) Int. Cl.
- *B29C 53/82* (2006.01)
- *B32B 3/12* (2006.01)
- *B29C 33/02* (2006.01)
- *B29C 33/76* (2006.01)
- *B29C 65/00* (2006.01)
- *B29C 70/34* (2006.01)
- *B29C 33/48* (2006.01)
- *B29D 99/00* (2010.01)
- *B31D 3/02* (2006.01)
- *B29C 43/32* (2006.01)
- *B29L 31/60* (2006.01)
- *B29C 35/04* (2006.01)

(56) References Cited

U.S. PATENT DOCUMENTS

| | | |
|---|---|---|
| 5,567,500 A | 10/1996 | Marshall et al. |
| 5,730,920 A | 3/1998 | Marshall et al. |
| 5,789,060 A | 8/1998 | Marshall et al. |
| 5,981,025 A | 11/1999 | Marshall et al. |
| 7,431,074 B1 | 10/2008 | Fellman et al. |
| 2010/0009124 A1* | 1/2010 | Robins et al. ............... 428/156 |
| 2010/0139850 A1 | 6/2010 | Morris et al. |
| 2011/0147564 A1* | 6/2011 | Kunze ....................... 249/114.1 |
| 2012/0021165 A1* | 1/2012 | Hethcock et al. ............. 428/107 |

FOREIGN PATENT DOCUMENTS

| | | |
|---|---|---|
| FR | 2655288 A1 | 6/1991 |
| WO | 0157354 A2 | 8/2001 |
| WO | 2006099671 A1 | 9/2006 |
| WO | 2011097433 A1 | 8/2011 |

OTHER PUBLICATIONS

European Search Report in related European Application No. 13171127.7, dated Nov. 26, 2013, 5 pages.

European Communication in related European Application No. 13171127.7, dated Dec. 9, 2013, 6 pages.

* cited by examiner

FIG. 15

PRESSURE TUNABLE EXPANDABLE MANDREL FOR MANUFACTURING A COMPOSITE STRUCTURE

BACKGROUND

1. Technical Field

The present disclosure relates to a system and method of using a pressure tunable mandrel to manufacture a composite structure.

2. Description of Related Art

A composite structure, such as a composite honeycomb core, can conventionally be manufactured using exterior tooling, such as a fixture applying clamp down pressure, in which the pressure required for curing of the composite material is generated by the pressure between the exterior tooling and interior tooling within the cells of the core. The precise control of the pressure at the cell walls of the honeycomb core can be difficult to generate and maintain during the cure process in part because of the tolerance stack-ups of the interior tooling. Further, the internal tooling can be difficult to remove after the cure cycle because the coefficient of thermal expansion of the tooling can be insufficient to break free from the cells walls of the honeycomb core.

Hence, there is a need for an improved system and method for manufacturing a composite core, or other composite structure that requires interior tooling and pressure.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
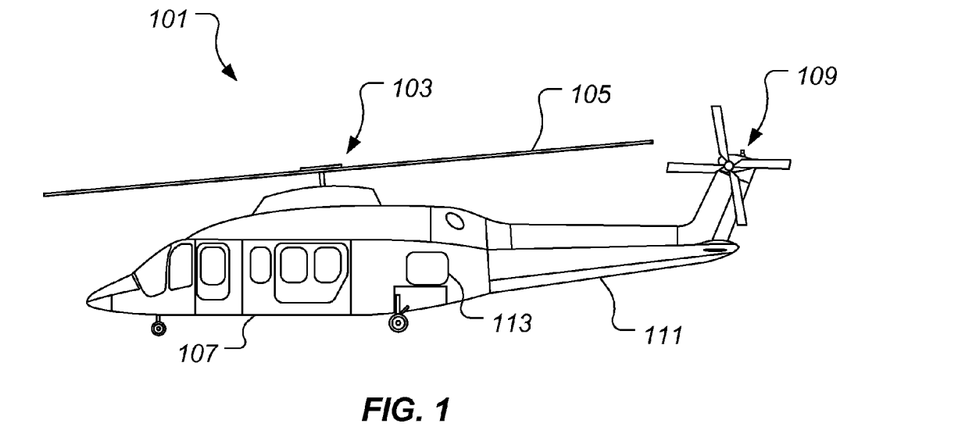
FIG. 1 is a side view of an rotorcraft, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. Rotorcraft 101 can further include a fuselage 107, anti-torque system 109, and an empennage 111.

Rotorcraft 101 is merely illustrative of the wide variety of aircraft and vehicles that are particularly well suited to take advantage of the method and system of the present disclosure. It should be appreciated that other aircraft can also utilize the method and system of the present disclosure. Further, other vehicles and structures can utilize composite core manufactured by the system and method of the present disclosure. Illustrative embodiments can include wind turbine blades, boat hull structures, radomes, enclosures, shelters, bridge decks, building facades, ground vehicles, rail vehicles, air vehicles, space vehicles, and manned or un-manned vehicles, to name a few.

Figure 2:
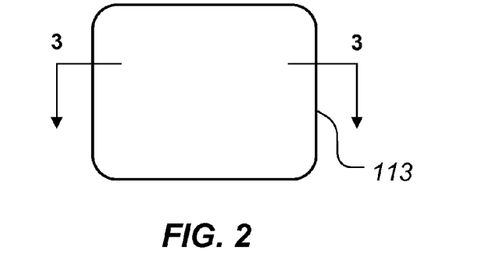
FIG. 2 is a side view of a panel, according to one example embodiment.
Figure 3:
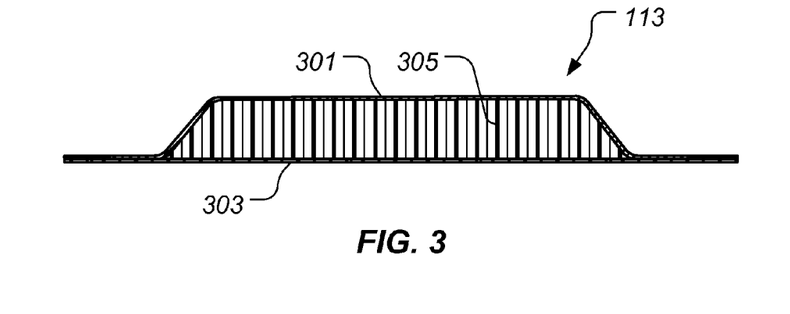
FIG. 3 is a cross-sectional view of the panel, taken from section lines 3-3 in FIG. 2, according to one example embodiment.

Referring now also to FIGS. 2 and 3, a panel 113 on rotorcraft 101 is illustrative of a wide variety of structures that can include a core member configured as a lightweight means of generating strength and stiffness in the structure. Panel 113 is a composite assembly that can include an upper skin 301, a lower skin 303, and a composite core 305. Composite core 305 can be adhesively bonded to upper skin 301 and lower skin 303. It should be appreciated that panel 113 can take on a wide variety of contours and configurations.

Figure 4:
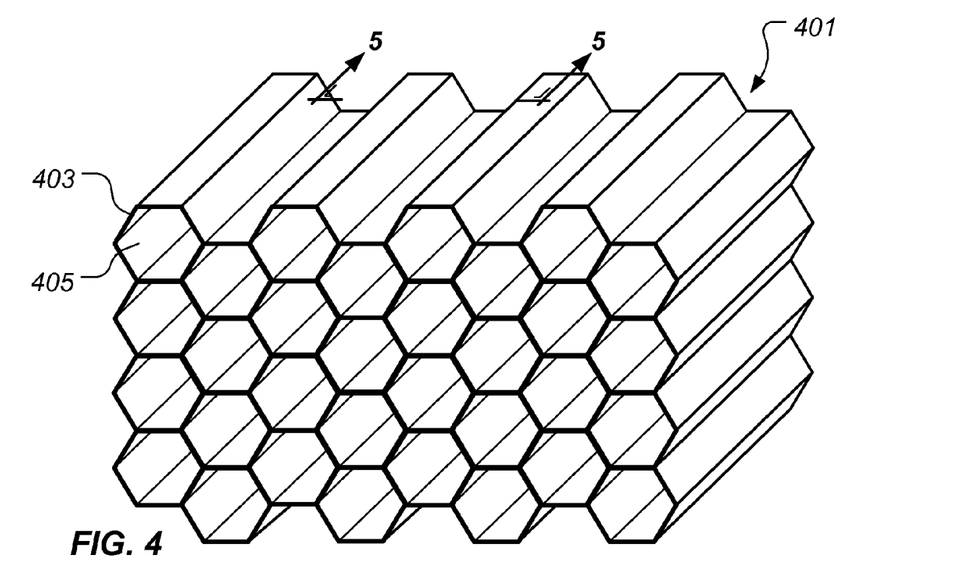
FIG. 4 is a perspective view of a composite core, according to one example embodiment.
Figure 5:
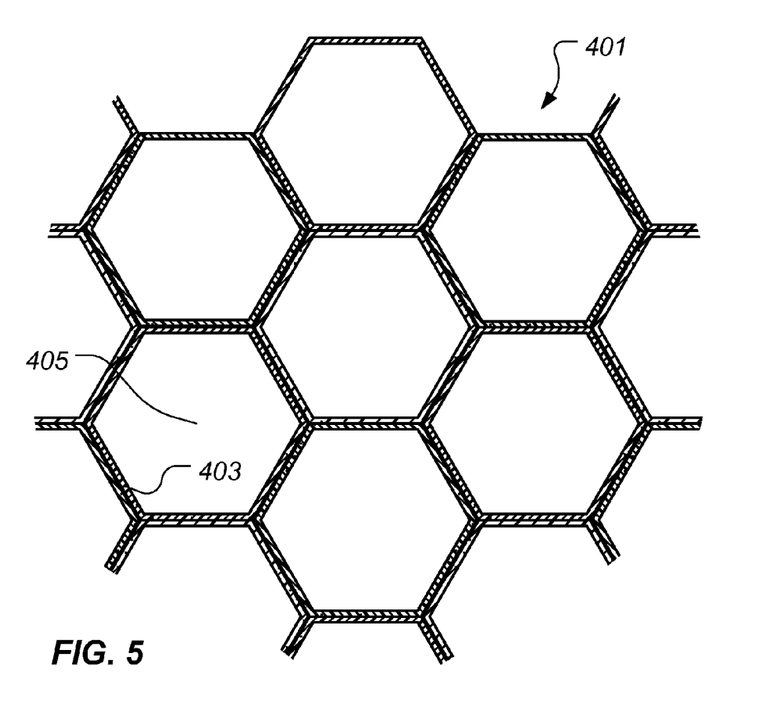
FIG. 5 is a cross-sectional view of the composite core, taken from section lines 5-5 in FIG. 4, according to one example embodiment.

Referring now also to FIGS. 4 and 5, composite core 401 is illustrated in a raw stock configuration. Composite core 305 (shown in FIG. 3), having implementation specific geometry, can be carved from composite core 401, for example. In another embodiment, composite core 401 is manufactured in a net shape such that a subsequent carving procedure is not required. Composite core 401 can be of a wide variety of materials and cell sizes. For example, in one embodiment composite core 401 is made from a carbon fiber and resin composite system. Composite core 401 includes a plurality of tubes 403 (only one tube labeled for clarity) arranged in a two-dimensional array. Each tube 403 defines a passageway or "cell" 405 extending therethrough. Composite core 401 can comprise any suitable number, size, cross-sectional shape, and construction of tubes 403.

Each tube 403 of composite core 401 can include a plurality of reinforcement fibers disposed in a polymeric matrix. For example, tubes 403 may comprise fibers comprising one or more of carbon, graphite, glass, an aromatic polyamide (i.e., "aramid") material, a variant of an aromatic polyamide material (e.g., a polyparaphenylene terephthalamide material, such as Kevlar® by E. I. du Pont de Nemours and Company of Richmond, Va.), or the like. The scope of the present disclosure, however, encompasses fibers comprising any suitable material or combination of materials. The polymeric matrix may comprise any suitable thermoplastic or thermosetting resin. Exemplary resins include epoxy, polyimide, polyamide, bismaleimide, polyester, vinyl ester, phenolic, polyetheretherketone (PEEK), polyetherketone (PEK), polyphenylene sulfide (PPS), to name a few.

The fibers of tubes 403 may be oriented in one or more directions and may be woven or unwoven. It should be appreciated that tube 307 may alternatively only include fibers arranged in a single direction, such as a uniaxial or helical fiber configurations. In yet another embodiment, a first ply comprises fibers and a second ply comprises fibers, such that the second ply is laid-up over the first ply.

Figure 6:
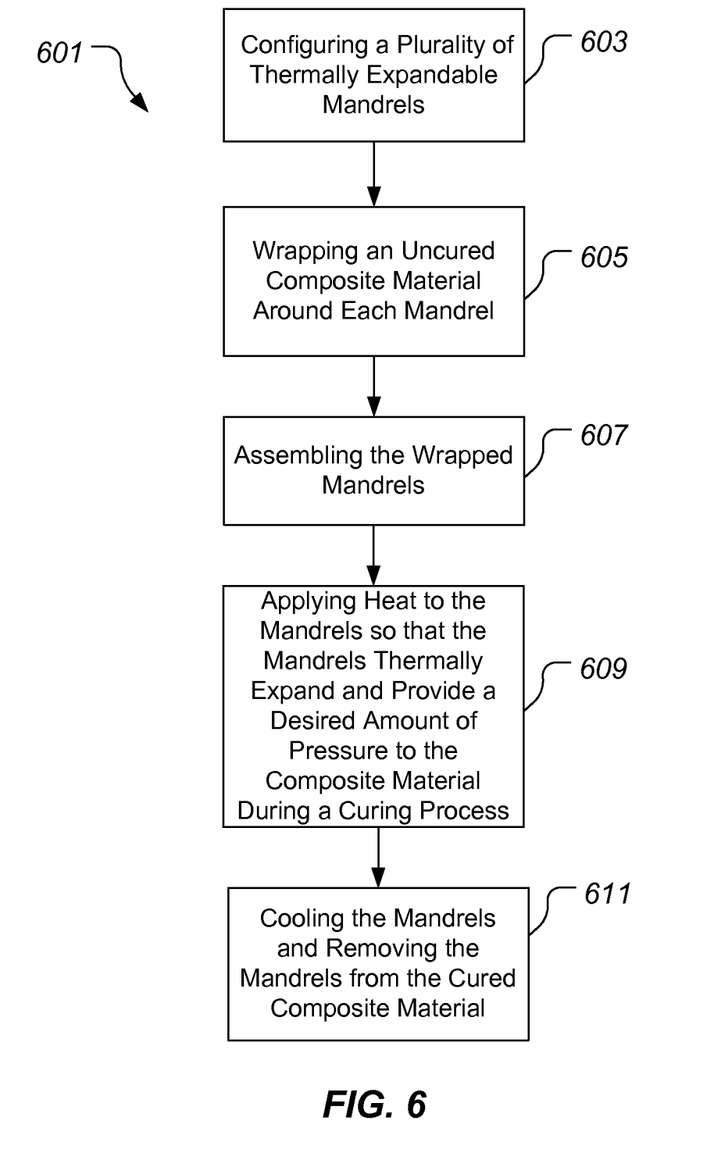
FIG. 6 is a schematic view of a method of manufacturing a composite core, according to one example embodiment.

Referring now also to FIG. 6, a method 601 of manufacturing a composite core, such as composite core 401, is schematically illustrated. Method 601 can include a step 603 of configuring a plurality of expandable mandrels. A step 605 can include wrapping an uncured composite material around each mandrel. A step 607 can include assembled the wrapped mandrels. A step 609 can include applying heat to the mandrels so that the mandrels thermally expand and provide a desired amount of pressure to the composite material during a curing process. A step 611 can include cooling the mandrels and removing the mandrels from the cured composite core. Each step of method 601 is described in further detail herein.

Figure 7:
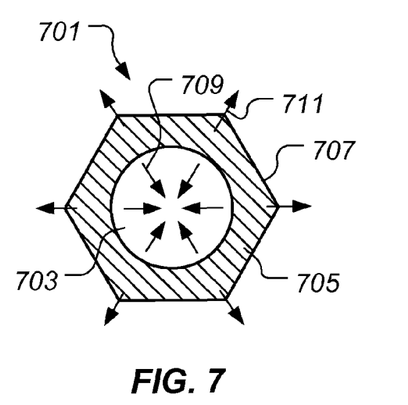
FIG. 7 is a cross-sectional view of a mandrel, according to example embodiment.

Referring now also to FIG. 7, a cross-sectional view through a mandrel 701 is illustrated. Step 603 includes configuring a plurality of expandable mandrels. For clarity, only a single mandrel 701 is illustrated. Mandrel 701 is configured having a material with a relatively high coefficient of thermal expansion (CTE). In one example embodiment, mandrel 701 is made with a plastic, semi-plastic, amorphous, elastic, or semi-crystalline material. For example, a thermoplastic material such as a polyetherimide, can be used in mandrel 701. Mandrel 701 can be fabricated with any material having a CTE greater than that of the composite material being formed, in the direction of compaction provided by mandrel 701 (radial direction relative to the mandrel 701); however, the exact amount of mandrel CTE can be implementation specific.

Mandrel 701 is configured with a hollow portion 703 extending through the centerline length of mandrel 701, defining a body portion 705 between hollow portion 701 and outer surface 707. In one embodiment, hollow portion 703 is formed from a molding process in which in an internal tool is used to form the shape of hollow portion 703. Mandrel 701 is configured so that during the curing process of the composite core 401, the temperature of each mandrel 701 is increased such that body portion 705 volumetrically expands uniformly both in an inward direction 709 and an outward direction 711, until outer surface 707 is bounded by its nearest neighbor mandrel, at which point the pressure exerted by mandrel 701 on its nearest neighbor mandrel remains relatively constant, and the thermal expansion of body portion 705 continues primarily in inward direction 709. Such a thermal expansion progression provides a period of relatively constant pressure required for laminating/curing of composite core 401 during the cure cycle. The geometry of mandrel 701 is selected to tailor the physical properties of mandrel 701, particularly the plasticity/elasticity of the material. Further, the wall thickness of body portion 705, as well as the geometry of hollow portion 703, are selectively controlled to produce a desired thermal expansion profile. For example, a mandrel having a smaller hollow portion 703 would provide a higher external pressure than mandrel 701 due to the greater thickness of the body portion, which would generate a greater amount of thermal expansion. In the illustrated embodiment, hollow portion 703 is of a cylindrical shape; however, it should be appreciated that other embodiments may have non-cylindrical shapes.

Figure 8:
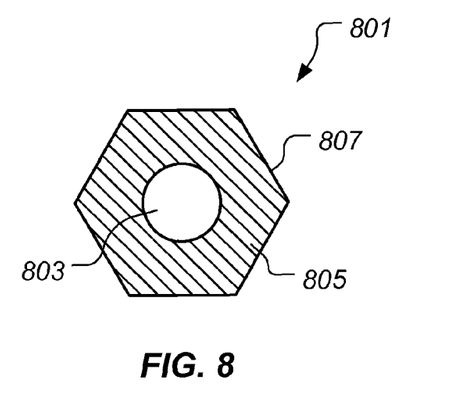
FIG. 8 is a cross-sectional view of a mandrel, according to example embodiment.

Referring now also to FIG. 8, a mandrel 801 is substantially similar to mandrel 701, thus the description herein regarding mandrel 701 is equally applicable to mandrel 801, except as indicated below. Similar to mandrel 701, mandrel 801 has a hollow portion 803, a body portion 805, and an outer surface 807. However, hollow portion 803 has a smaller diameter as compared to the diameter of hollow portion 703 of mandrel 701. Thus, mandrel 801 is configured to provide a greater amount of thermal expansion at a given temperature as compared to mandrel 701. Thus, mandrel 801 is configured to provide a greater amount of external pressure upon the composite material between adjacent mandrels, as compared to mandrel 701 at a given temperature. Further, mandrel 801 can be particularly desirable for use in a curing cycle in which the relatively constant pressure period is desired at a relatively low temperature.

Figure 9:
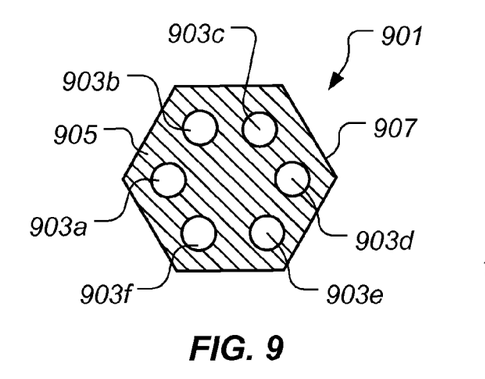
FIG. 9 is a cross-sectional view of a mandrel, according to example embodiment.

Referring now also to FIG. 9, a mandrel 901 is substantially similar to mandrel 701, thus the description herein regarding mandrel 701 is equally applicable to mandrel, except as indicated below. Similar to mandrel 701, mandrel 901 has a body portion 905, and an outer surface 907. However, mandrel 901 has a plurality of hollow portions, such as hollow portions 903a-903e. In the illustrated embodiment, hollow portions 903a-903e are equally sized and equidistantly located around the central axis of mandrel 901, thus providing a uniform symmetric external pressure during thermal expansion. However, hollow portions 903a-903e can be individually sized and located to provide an asymmetric external pressure as a result of thermal expansion.

Figure 10:
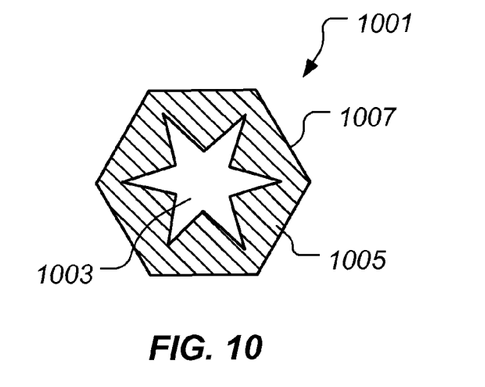
FIG. 10 is a cross-sectional view of a mandrel, according to example embodiment.

Referring now also to FIG. 10, a mandrel 1001 is substantially similar to mandrel 701, thus the description herein regarding mandrel 701 is equally applicable to mandrel 1001, except as indicated below. Similar to mandrel 701, mandrel 1001 has a hollow portion 1003, a body portion 1005, and an outer surface 1007. However, hollow portion 1003 is in the shape of star, the star shape having a plurality of leg members. Mandrel 1001 is configured such that hollow portion 1003 provides multiple stages of pressure plateaus by transitioning from one to another primary collapse mechanism. For example, as the temperature of body portion 1005 increases, the triangular leg members collapse first, providing an initial pressure plateau, next the central area would then shrink in diameter, thus providing a second pressure plateau.

Figure 11:
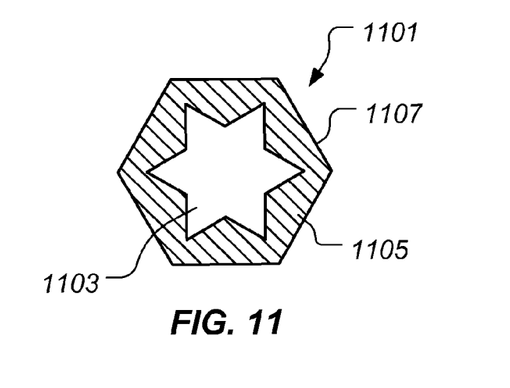
FIG. 11 is a cross-sectional view of a mandrel, according to example embodiment.

Referring now also to FIG. 11, a mandrel 1101 is substantially similar to mandrel 1001, thus the description herein regarding mandrel 1001 is equally applicable to mandrel 1101, except as indicated below. Similar to mandrel 1001, mandrel 1101 has a hollow portion 1103, a body portion 1105, and an outer surface 1107. However, the hollow geometry of the leg members of the star shape are wider, as compared to the leg members of hollow portion 1003 of mandrel 1001. Mandrel 1101 is illustrative of how the geometry of hollow portion 1103 can be tailored to provide implementation specific pressure profiles throughout the curing process.

It should be appreciated that mandrels 701, 801, 901, 1001, and 1101 are merely illustrative of a wide variety of mandrel configuration contemplated. Even though the exterior shape of the mandrels are illustrated as hexagonal, the present disclosure includes mandrels having other exterior shapes, such as square, rectangular, triangular, to name a few examples. Further, it should be appreciated that the hollow portion within the mandrels can be any variety of shape, or shapes. The exact shape of the hollow portion is implementation specific. Further, the hollow portion can have features that fully or partially collapse to create pressure plateaus. The exact shapes of the collapsible features are implementation specific. Further, the shape and size of the hollow portion can be configured so as to provide a greater amount of external pressure at the corners of the mandrel, thereby creating a larger amount of pressure at the node portions where the adjacent composite members join, which can be desirable to prevent voids from forming at the nodes. A node 1301 (illustrated in FIG. 13), is joint intersection of adjacent composite tubes 403. Further, a graded mixture of multiple hollow portions can be utilized to ramp pressure at a lower slope that that of a solid material response. The graded mixture of sized hollow portions can be in the form of spherical or near spherical bubbles contained and distributed in the body portion of the mandrel.

Figure 14:
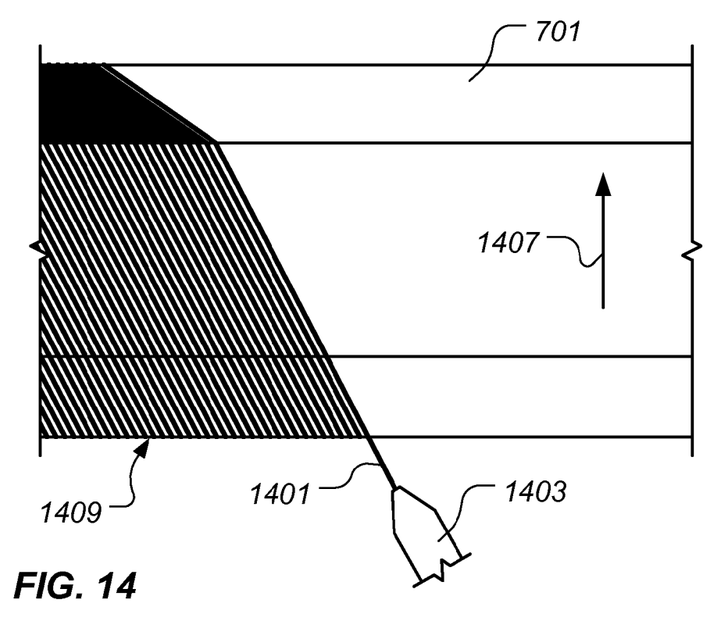
FIG. 14 is a stylized, plan view of an illustrative embodiment of a mandrel being wrapped with uncured composite material, according to one particular embodiment.

Referring again to FIG. 6, step 605 includes wrapping an uncured composite material around each mandrel, such as mandrel 701. The exact method of wrapping or otherwise depositing the uncured composite material on the exterior surface of each mandrel. In one example embodiment, a Teflon® material, or other bond resistant material, can be used to prevent the composite material from bonding to the exterior surface of mandrel 701 during the cure cycle. Referring also to FIG. 14, one technique of wrapping uncured composite material around mandrel 701 utilizes a filament winding process. A continuous, resin-impregnated fiber 1401, extending from a filament winding machine 1403, is wound about mandrel 701. The resin can be either a thermosetting or thermoplastic resin and becomes the polymeric matrix of tube 403 upon curing. The material placement process may be conducted in a variety of processes; however, it is preferred that the mandrel 701 moves axially while a spool of fiber 1401 rotates around the mandrel 701, as indicated by an arrow 1407. Alternatively, a spool or a plurality of spools of material could rotate around mandrel 701. Relative motion of the material dispensing mechanism to mandrel 701 is inferred. As fiber 1401 is wound onto mandrel 701 by filament winding machine 1403, a helical shaped pattern is formed. One or more plies 1409 of fiber 1401, in desired orientations with respect to mandrel 701, are wound onto mandrel 701 to form the basic geometry of tube 403. The angle of which fiber 1401 is wound about mandrel 701 may vary along the length of the mandrel 701 in order to customize the strength of core 401. For example, the angle of the fiber 1401 may be dynamically changed during the material placement process in order to customize a compressive strength of the core. Note that, in the illustrated embodiment, mandrel 701 exhibits a size and shape corresponding to cell 405 (see FIG. 4 or 5). It should be further noted; however, that the present description is not limited to the particular illustrated configurations of filament winding machine 1403 or mandrel 701. Mandrel 703 and the one or more plies 1409 that have been filament wound onto mandrel 701 are subsequently assembled with other mandrels and plies, as will be discussed in greater detail herein, to form core 401 (shown in FIG. 4). It should further be appreciated that upon cutting of plies 1409 and the mandrel 701, the material may have a tendency to un-wind. A band of material, potentially adhesive or fiberous, may be used to keep fiber 1401 from unraveling upon cutting of the plies 1409 and the mandrel 701. An adhesive material with unidirectional fibers could be used to band the fiber 1401 on mandrel 701 and remain compatible with the base material.

Figure 15:
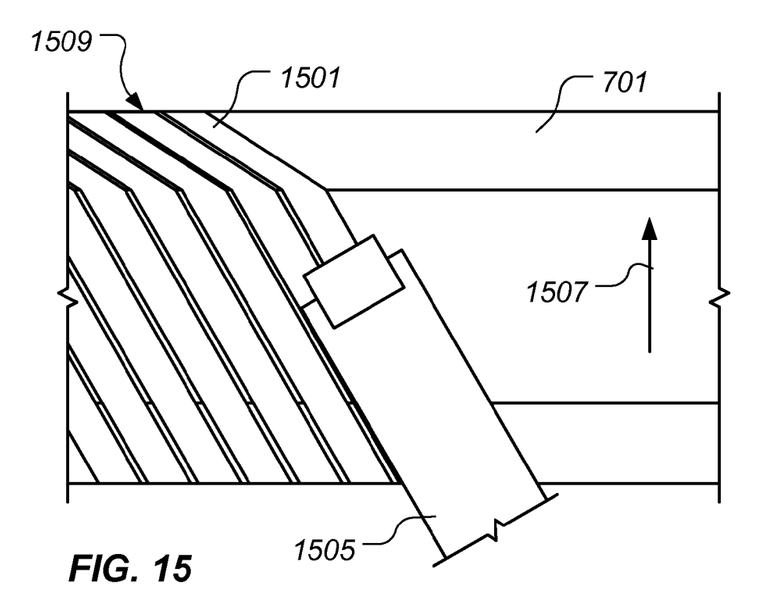
FIG. 15 is a stylized, plan view of an illustrative embodiment of a mandrel being wrapped with uncured composite material, according to one particular embodiment.

In yet another example technique of performing step 605 of method 601, shown in FIG. 15, wrapping uncured composite material around mandrel 701 is performed using a fiber placement process. A continuous, resin-impregnated tow 1501 (only one labeled for clarity) of approximately 1000 fibers is applied to a mandrel 701 by a fiber placement machine 1505. It should be appreciated that tow 1501 may also be portions of a full tow; for example, tow 1501 may be a half tow of 500 fibers. In lieu of a tow 1501, a tape of fibers, cut to a prescribed width, may be used. A pre-cut tape of fibers may be referred to as a "slit-tape." A slit-tape allows the user to more closely control the width dimension, as compared to a tow of fibers. Exemplary prescribed widths of slit-tape include ⅛" and ¼", to name a few. The resin can be a thermosetting or thermoplastic resin, to name two examples, and becomes the polymeric matrix of tube 403 upon curing. During the fiber placement process, mandrel 701 moves axially while tow 1501 rotates around the mandrel 701, as indicated by an arrow 1507. As tow 1501 is applied to mandrel 701 by fiber placement machine 1505, a helical shaped pattern is formed. One or more plies 1509 of tow 1501, in desired orientations with respect to mandrel 701, are wound onto mandrel 701. It should be appreciated that more than one tow 1501 of different materials may be used. Note that, in the illustrated embodiment, mandrel 1503 exhibits a size and shape corresponding to cell 405 (see FIG. 4 or 5). It should be further noted, however, that the present description is not limited to the particular illustrated configurations of fiber placement machine 1505 or mandrel 701. Mandrel 701 and the one or more plies 1509 that have been fiber placed onto mandrel 701 are subsequently assembled with other mandrels and plies, as will be discussed in greater detail below, to form core 401 (shown in FIG. 4).

Figure 12A:
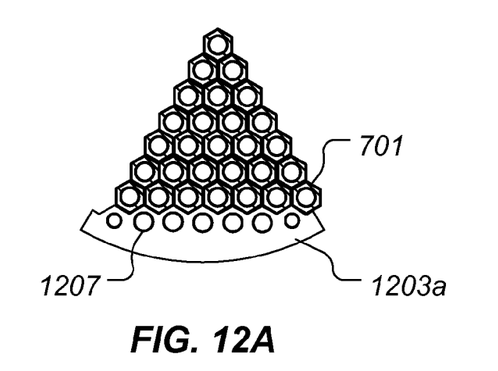
FIG. 12A is a is a cross-sectional view of a plurality of composite-wrapped mandrels assembled on a partial tool, according to one example embodiment.
Figure 12B:
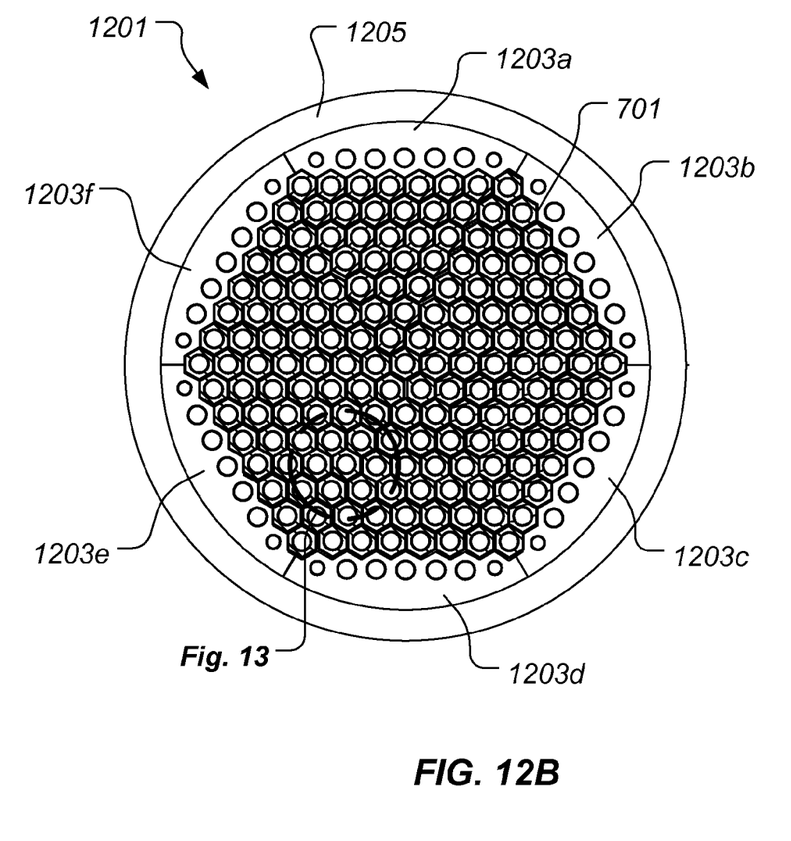
FIG. 12B is a is a cross-sectional view of a plurality of composite-wrapped mandrels assembled in a curing tool, according to one example embodiment.
Figure 13:
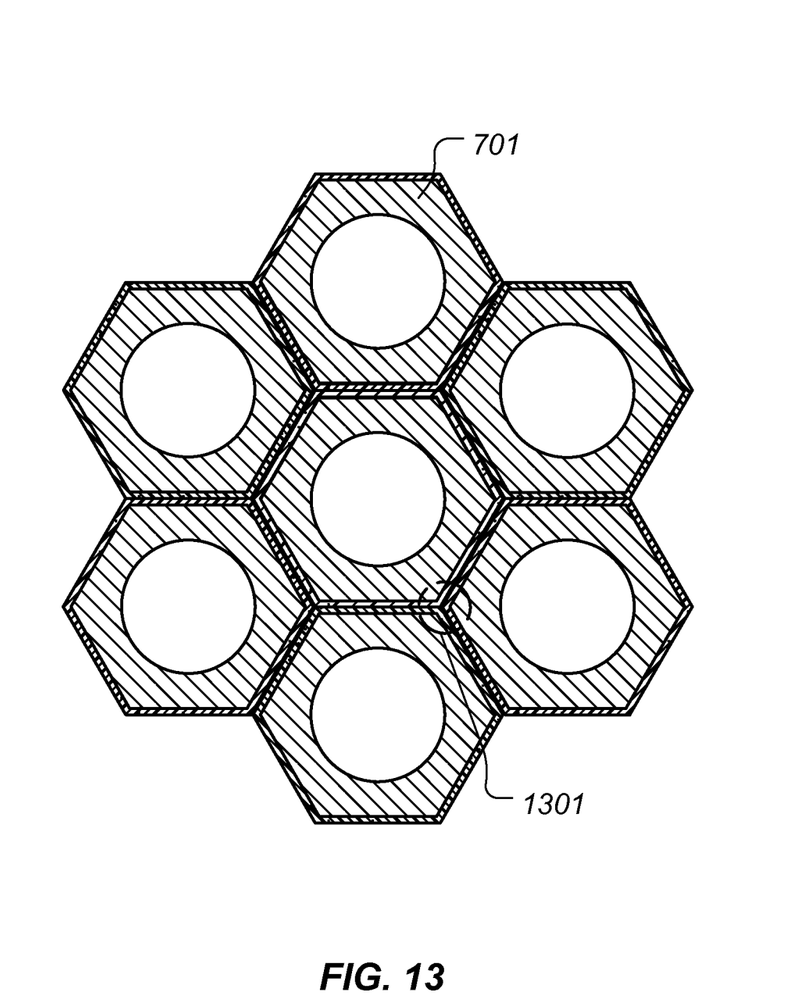
FIG. 13 is a detail view taken from FIG. 12B, according to one example embodiment.

Referring again to FIG. 6, step 607 of method 601 includes assembling the wrapped mandrels. Step 607 can further include assembling and inserting the wrapped mandrels in a tool or other fixture. The exact configuration of the tool is implementation specific. Referring now also to FIGS. 12A, 12B, and 13, an example of a tool 1201 is illustrated. Tool 1201 can include a plurality of partial tools 1203a-1203f that collectively form an exterior cylindrical shape with a hexagonal shaped composite core 401; however, tool 1201 can be configured to produce composite core 401 of any desired shape. For example, alternative shapes of tool 1201 can be configured to produce circular, square, rectangular, or even part customized shapes of composite core 401. In the illustrated embodiment, the plurality of mandrels 701 having wrapped composite material are stacked on partial tools 1203a-1203f. Then, each partial tool 1203a-1203f with wrapped mandrels are assembled and inserted into a rigid member 1205. The wrapped mandrels can be assembled with partial tools 1203a-1203f in a procedure such that the volume formed in the interior of partial tools 1203a-1203f is filled with wrapped mandrels. Rigid member 1205 is configured to provide a restraining force as the mandrels thermally expand during the cure cycle. Preferably, rigid member 1205 has a CTE less than mandrels 701. In another embodiment, rigid member 1205 is a multi-piece or articulated tool that is configured such that the plurality of mandrels 701 having wrapped composite material are placed or stacked inside rigid member 1205. Further, a layer of a bond resistant layer can be placed between the exterior of partial tools 1203a-1203f and the interior of rigid member 1205 to facilitate the placing partial tools 1203a-1203f within rigid member 1205. In one embodiment, each partial tool 1203a-1203f can be made of a material similar to that of mandrels 701. Each partial tool 1203a-1203f can include apertures 1207 that are sized and configured to tailor the thermal expansion of each partial tool 1203a-1203f during the curing process.

Referring again to FIG. 6, step 609 of method 601 includes applying heat to mandrels 701 so that the mandrels 701 thermally expand and provide a desired amount of pressure to the composite material during a curing process. In one embodiment, mandrels 701 are controllably heated by flowing heated air through the length of the hollow portion 703 of mandrel 701. Mandrels 701 are tailored to so that the thermal expansion provides a relatively constant and even pressure, at a selected time, during a non-isothermal composite cure event. A cure cycle can require that high pressure be obtained at a temperature lower than the cure temperature, and that such a high pressure then be maintained during "heat-up" to a cure temperature. Mandrel 701 is pressure tunable such that it thermally expands uniformly with the heat from the cure cycle, thereby applying even pressure through the entire length of the mandrel 701, until the mandrel 701 reaches a relatively constant pressure, then increased temperature expands body portion 705 into the hollow portion 703, thereby moderating the pressure at the external surface 707. Consequently, the composite material is maintained at a constant or near-constant pressure as the temperature is increased to the cure temperature. After the cure cycle is complete, a composite core 401 is achieved as the uncured composite material around each mandrel 701 becomes is rigidly bonded to each adjacent tube 403.

Still referring to FIG. 6, step 611 of method 601 includes cooling mandrels 701 and removing mandrels 701 from the composite core 401. The cooling of mandrels 701 allows them to be easily separated from the composite core 401 since mandrels 701 have a higher CTE than the composite core 401. In another embodiment, the removal of mandrels 701 from composite core 401 can be enhanced by collapsing the mandrels 701 by drawing a vacuum in the hollow portion 703.

The systems and methods disclosed herein include one or more of the following advantages. For example, one advantage of the present disclosure is that the mandrels are pressure tunable, such that the mandrel can be tuned to produce a desired pressure profile on the composite material during the cure cycle. Further, the mandrels are configured such that the amount of thermal shrinkage experience by the mandrels during the cooling phase promotes the ease of separation and removal of the mandrels from the composite core. The method of the present disclosure allows for production of high quality composite core, in part because the mandrel can be tailored to asymmetrically provide pressure to portions of the core where a higher amount of pressure can be desired, such as at the node portions of the composite core. The method of the present disclosure allows for the efficient production of composite core, which can reduce the cost of the composite core.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of making a composite core, the method comprising:
    providing a plurality of mandrels, each mandrel comprising:
        a body portion with an outer surface, the outer surface defining an ultimate shape of a tube member of the composite core; and
        a hollow portion that defines an internal surface of the body portion, the hollow portion having a star shaped geometry that is collapsible in multiple pressure stages, the star shaped geometry having a plurality of flat walled leg portions that each terminate at a point, the plurality of flat walled leg portions extending from an interior portion;
    placing a composite material around each mandrel;
    placing the plurality of mandrels in a tool, the tool being configured to constrain the plurality of mandrels as the mandrels experience a thermal expansion;
    heating the mandrels so that the mandrels thermally expand, thereby applying a pressure to the composite material during a cure cycle, the step of heating the mandrels including increasing a temperature of the mandrels for a duration, the increase in temperature during the duration causing a first pressure plateau as the flat walled leg portions of the hollow portion collapse and second pressure plateau as a diameter of the interior portion collapses; and
    cooling and separating the mandrels from the composite core.

2. The method according to claim 1, wherein the step of placing the composite material around each mandrel includes wrapping the composite material around each mandrel.

3. The method according to claim 1, wherein each mandrel has a coefficient of thermal expansion that is non-linear in a radial direction.

4. The method according to claim 1, wherein each mandrel has a hexagonal shape.

5. The method according to claim 1, wherein the step of heating the mandrels so that the mandrels thermally expand includes flowing air through the hollow portion in each mandrel.

6. The method according to claim 1, wherein the step of placing the plurality of mandrels in a tool includes stacking the mandrels adjacently to form a first tube member that has another tube member adjacent to each faceted surface of the first tube member.

7. The method according to claim 1, wherein the step of heating the mandrels so that the mandrels thermally expand includes controlling the temperature of the mandrels so as to control the pressure exerted upon the composite material by the mandrels.

* * * * *